US012656530B2

(12) United States Patent
Hansson et al.

(10) Patent No.: US 12,656,530 B2
(45) Date of Patent: Jun. 16, 2026

(54) OPTICAL ELEMENTS INCLUDING A METASTRUCTURE HAVING CONE-SHAPED OR TRUNCATED CONE-SHAPED META-ATOMS AND ITS MANUFACTURING METHOD

(71) Applicant: NILT Switzerland GmbH, Horgen (CH)

(72) Inventors: Niklas Hansson, Askim (SE); James Eilertsen, Skodsborg (DK)

(73) Assignee: NILT Switzerland GmbH, Horgen (CH)

( * ) Notice: Subject to any disclaimer, the term of this patent is extended or adjusted under 35 U.S.C. 154(b) by 300 days.

(21) Appl. No.: 18/039,452

(22) PCT Filed: Nov. 26, 2021

(86) PCT No.: PCT/EP2021/083176
§ 371 (c)(1),
(2) Date: May 30, 2023

(87) PCT Pub. No.: WO2022/117458
PCT Pub. Date: Jun. 9, 2022

(65) Prior Publication Data

US 2024/0085589 A1 Mar. 14, 2024

Related U.S. Application Data

(60) Provisional application No. 63/119,949, filed on Dec. 1, 2020.

(51) Int. Cl.
*G02B 1/00* (2006.01)
*B82Y 20/00* (2011.01)

(52) U.S. Cl.
CPC .............. *G02B 1/002* (2013.01); *B82Y 20/00* (2013.01); *G02B 2207/101* (2013.01)

(58) Field of Classification Search
CPC ........ G02B 5/008; G02B 1/002; G02B 1/007; G02B 26/06; G02B 1/005; G02B 5/1809; G02F 1/292; G02F 2202/30
See application file for complete search history.

(56) References Cited

U.S. PATENT DOCUMENTS 6,483,635 B1 * 11/2002 Wach .................... H01S 5/1082 359/344
2016/0071990 A1 * 3/2016 Smith .................. H10F 77/707 438/93

(Continued)

FOREIGN PATENT DOCUMENTS

EP 3624248 3/2020

OTHER PUBLICATIONS

Ahmad et al., "Gold Cone Metasurface MIC Sensor with Monolayer of Graphene and Multilayer of Graphite," Plasmonics, Jun. 2016, 12:497-508.

(Continued)

*Primary Examiner* — Jonathan Y Jung
(74) *Attorney, Agent, or Firm* — Fish & Richardson P.C.

(57) ABSTRACT

Optical element including an optical metastructure composed, at least in part, of cone-shaped or truncated-shaped meta-atoms, such as pyramid-shaped or frustum-shaped meta-atoms, method of manufacturing the optical element, and optical device comprising the optical element. The manufacturing may include the use of sputtering to deposit the material for the meta-atoms, which may be embedded, for example, in a polymer layer. The optical element might be composed of a stack of two metastructured layers.

20 Claims, 7 Drawing Sheets

(56) References Cited

U.S. PATENT DOCUMENTS

2018/0039102 A1* 2/2018 Baik .................... G06F 30/17
2020/0284960 A1* 9/2020 Ellenbogen ............. G02B 5/20
2020/0301053 A1 9/2020 Wang et al.
2020/0355913 A1* 11/2020 Park .................... G02B 1/002
2022/0120969 A1* 4/2022 Karabchevsky ....... G02B 6/262

OTHER PUBLICATIONS

Bergine, "Periodic or random nanostructures for light scattering control," Applied Physics A: Materials Science & Processing, Mar. 2016, 122:318, 10 pages.
International Preliminary Report on Patentability in International Appln. No. PCT/EP2021/083176, mailed on Jun. 15, 2023, 8 pages.
International Search Report and Written Opinion in International Appln. No. PCT/EP2021/083176, mailed on Mar. 11, 2022, 13 pages.
Yu et al., "Nanoimprint technology for patterning functional materials and its applications," Microelectronic Engineering, Jan. 2015, 132:98-119.

* cited by examiner

SPUTTER
104
100
114
116
118
106
108
110
102
112

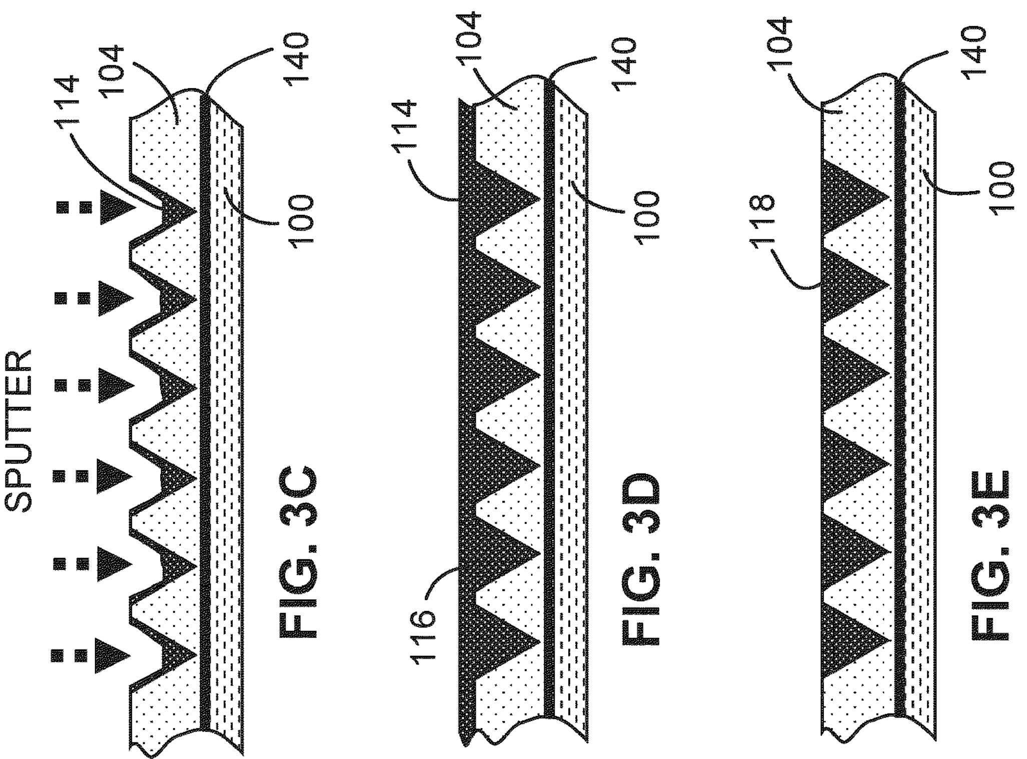
FIG. 3C
FIG. 3D
FIG. 3E
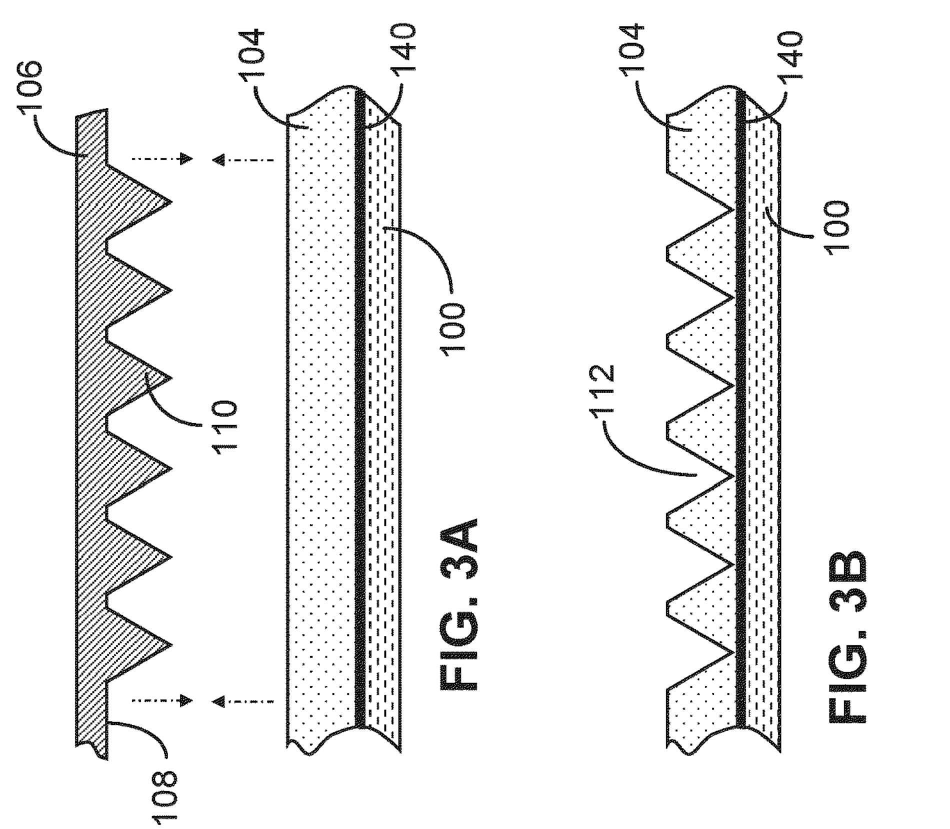
FIG. 3A
FIG. 3B

OPTICAL ELEMENTS INCLUDING A METASTRUCTURE HAVING CONE-SHAPED OR TRUNCATED CONE-SHAPED META-ATOMS AND ITS MANUFACTURING METHOD

CROSS-REFERENCE TO RELATED APPLICATIONS

This application is a National Stage application under 35 U.S.C. § 371 of International Application No. PCT/EP2021/083176, filed on Nov. 26, 2021, which claims priority and benefit from U.S. Provisional Patent Application No. 63/119,949, filed on Dec. 1, 2020, the contents and disclosures of which are incorporated herein by reference in their entirety.

FIELD OF THE DISCLOSURE

The present disclosure relates to optical elements that include a metastructure.

BACKGROUND

Advanced optical elements may include an optical metasurface, which refers to a surface with distributed small structures (e.g., meta-atoms) arranged to interact with light in a particular manner. For example, a metasurface, which also may be referred to as a metastructure, can be a surface with a distributed array of nanostructures. The nanostructures may, individually or collectively, interact with light waves. For example, the nanostructures or other meta-atoms may change a local amplitude, a local phase, or both, of an incoming light wave.

SUMMARY

The present disclosure describes techniques for manufacturing optical elements that include an optical metastructure composed at least in part of cone-shaped or truncated cone-shaped meta-atoms. The techniques can include the use of sputtering to deposit the material for the meta-atoms, which may be embedded, for example, in a polymer layer.

For example, in one aspect, the disclosure describes an apparatus comprising an optical element that includes an optical metasurface including meta-atoms, wherein each of the meta-atoms is cone-shaped or has a truncated cone shape.

Some implementations include one or more of the following features. For example, in some cases, each of the meta-atoms has a shape of a right circular cone. In some cases, each of the meta-atoms has a polygon-shaped base and triangular lateral faces that meet at a vertex. In some cases, each of the meta-atoms is frustum-shaped. In some instances, each of the meta-atoms is surrounded laterally by a polymeric material.

In some implementations, the optical element includes a first sub-structure that includes first ones of the meta-atoms, and a second sub-structure that includes second ones of the meta-atoms, wherein the first and second sub-structures are stacked one over the other. In some cases, the first and second sub-substructures are separated from one another by an adhesive or other bonding layer.

The disclosure also describes a method of manufacturing an optical element. The method includes imprinting a replication material using a stamp to form depressions in the replication material, wherein the stamp has projections that are pressed into the replication material, each of the projections being cone-shaped or having a truncated cone shape. The method further includes depositing a metamaterial in the depressions to form meta-atoms, each of the meta-atoms being cone-shaped or having a truncated cone shape.

Some implementations include one or more of the following features. For example, the metamaterial can be deposited in the depressions by sputtering. In some cases, after the sputtering, polishing may be performed to flatten or remove a residual layer of the metamaterial. In some instances, the metamaterial comprises silicon or a metal.

The replication material may comprise, for example, a polymeric material. In some cases, each of the meta-atoms is surrounded laterally by the polymeric material.

In some implementations of the method, each of the meta-atoms has a shape of a right circular cone. In some cases, each of the meta-atoms has a polygon-shaped base and triangular lateral faces that meet at a vertex. Further, in some cases, each of the meta-atoms is frustum-shaped.

The disclosure also describes an apparatus that includes at least one of a light emitter or a light sensor, and an optical element positioned to intersect an outgoing light wave produced by the light emitter or to intersect an incoming light wave that is to be detected by the light sensor. The optical element includes an optical metasurface including meta-atoms, wherein each of the meta-atoms is cone-shaped or has a truncated cone shape. The metasurface may be operable to change at least one of a local amplitude, a local phase, or both, of the outgoing or incoming light wave.

Some implementations include one or more of the following advantages. Imprinting high aspect-ratio structures can be challenging, and stamps used to imprint such structures may exhibit reduced lifetime and/or fatigue. Using a stamp to imprint cone-shaped features and using sputtering to at least partially fill the cone-shaped features with a meta-material allows a reliable method to be used for depositing the meta-material. Further, forming meta-atoms composed of a high-index material is desirable in some applications (e.g., applications involving relatively long wavelengths), and sputtering can facilitate the deposition of such high-index materials.

Other aspects, features, and advantages will be readily apparent from the following detailed description, the accompanying drawings, and the claims.

BRIEF DESCRIPTION OF THE DRAWINGS

FIGS. 3A-3H illustrate a third example of fabricating a device that includes an optical metastructure including cone-shaped or truncated cone-shaped meta-atoms.

DETAILED DESCRIPTION

As described in greater detail below, a metastructure can be transferred, for example, to a curable polymer by replication techniques. In general, replication refers to a technique by means of which a given structure is reproduced, e.g., etching, embossing or molding. In an example of a replication process, a structured surface is embossed into a liquid or plastically deformable material (a "replication material"), then the material is hardened, e.g., by curing using ultraviolet (UV) radiation or heating, and then the structured surface is removed. Thus, a negative of the structured surface (a replica) is obtained. The replicated structure provides a mechanical, electrical, or optical functionality (or a combination of those functionalities) due to the structure imposed by the structured surface. In some cases, replication may be implemented by stamping processes. In the case of a stamping process, which also may be referred to as an imprinting process, the structured surface is a surface of a stamp that is pressed into the liquid or plastically deformable material (or has the liquid or plastically deformable material pressed into it).

"Imprinting," as used in this disclosure, may include other processes such as one or more of embossing, debossing, stamping, or nano-imprinting.

While in some implementations the liquid or plastically deformable material in an imprinting process is a bulk material (for example, a block of material), in other implementations the liquid or plastically deformable material is a layer or droplet (e.g., a coating) provided on a substrate surface.

Figures 1A, 1B, 1C, 1D, 1E:
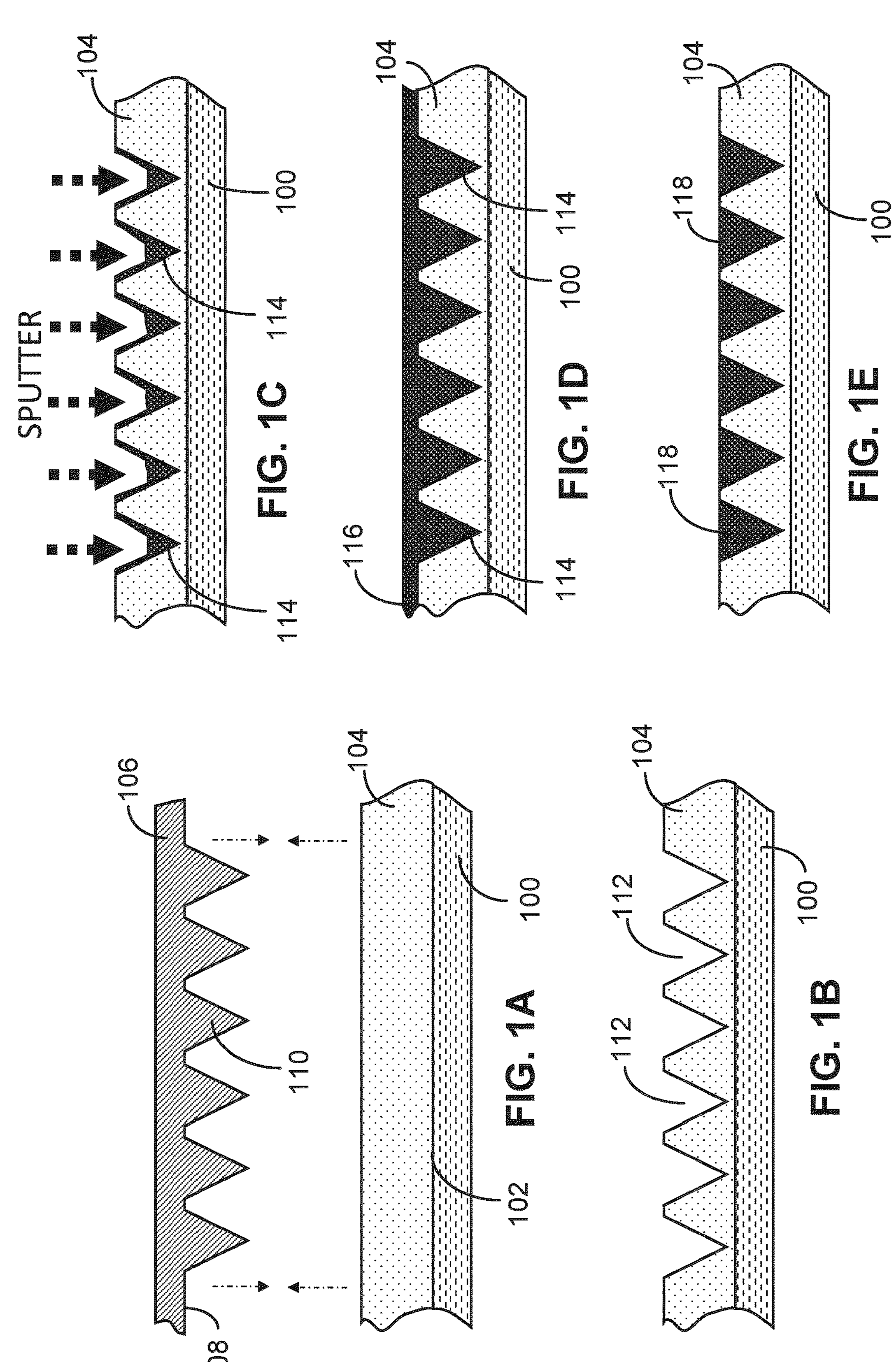
FIGS. 1A-1E illustrate a first example of fabricating a device that includes an optical metastructure including cone-shaped or truncated cone-shaped meta-atoms.

As shown in FIG. 1A, some implementations include a substrate 100 having a substrate surface 102 on which is disposed a replication material 104. The substrate 100 can be composed, for example, of fused silica or a glass. In some implementations, the substrate 100 includes structures not shown in FIG. 1A, e.g., metasurfaces, waveguides, or other optical structures.

The replication material 104 includes, in various implementations, one or more of a polymer, a spin-on-glass, or any other material that may be structured in a replication process. Suitable materials for replication include, for example, hardenable (e.g., curable) polymer materials or other materials which are transformable in a hardening or solidification step (e.g., a curing step) from a liquid or plastically deformable state into a solid state. For example, in some implementations the replication material 104 is a UV-curable and/or thermally-curable epoxy or resin (e.g., a photoresist). In some implementations, the replication material 104 is transparent before and/or after curing.

The replication material 104, in some implementations, has characteristics suitable for a device resulting from the replication. For example, the replication material (in either as-deposited or cured form) may have a particular refractive index, thermal or electrical conductivity, or chemical or physical resistance (e.g., low reactivity with atmospheric oxygen). A wide variety of materials suitable for replication may be used. Preferably, the substrate 100 is index-matched with the relatively low-index material of the replication material 104 (i.e., they should have similar refractive indices).

The replication material 104 can be disposed, for example, on the substrate surface 102 and is imprinted using a stamp 106. In some implementations, the replication material 104 is deposited onto the substrate surface 102, after which the stamp 106 is brought into contact with the replication material 104. Examples of methods for depositing the replication material 104 include printing (e.g., inkjet printing), jetting, dispensing, screenprinting, dip coating, and spin coating. In some implementations, the replication material 104 is deposited in portions of precisely known volumes (e.g., in volumes exact to within less than 3% of the deposited volume of each portion).

In some implementations, the replication material 104 is provided on the stamp 106 (e.g., onto the structured stamp surface 108), and the stamp 106 is then brought towards the substrate 100 (or has the substrate 100 brought towards it), such that the replication material 104 is disposed on the substrate 100 as a result of relative movement of the stamp 106 and the substrate 100.

The stamp 106 may be composed of a variety of materials, including a cured replication material and/or a patterned semiconductor wafer (e.g., a patterned silicon wafer), in some implementations including deposited metal layers. In some implementations, all or part of the stamp 106 is transparent, e.g., is composed of glass. In some implementations, the stamp 106 is thin and/or flexible, e.g., composed of polycarbonate foil. In some implementations, structured features of the stamp 106, such as the structured stamp surface 108, are composed of a polymer, e.g., polydimethylsiloxane (PDMS).

In accordance with the present disclosure, the structured surface 108 of the stamp 106 preferably includes projections 110, each of which has a flared cross-section such that the cross-section increases (or decreases) substantially continuously from end of the projection to an opposite end of the projection. Thus, for example, in some implementations, each of the projections 110 has the shape of a cone. In this context, cone-shaped means the projection has a circular or polygonal-shaped base and one vertex. Thus, in some implementations, each of the cone-shaped projections 110 has the shape of a right circular cone (i.e., having a circular base and an axis that passes through the center of the base at right angles to its plane). In other instances, each of the cone-shaped projections is pyramid-shaped (i.e., having a polygon-shaped base and triangular lateral faces that meet at the vertex). In some implementations, each of the projections 110 has the shape of a truncated cone (i.e., a cone in which a region that includes the apex is cut off by a plane). An example of a truncated cone is a frustum, in which the truncation plane is parallel to the cone's base.

As illustrated in FIG. 1B, imprinting by the stamp 106 causes the replication material 104 to have cone-shaped (or truncated cone-shaped) depressions 112, each of which is essentially a negative of a corresponding one of the stamp's projections 110. The replication material 104 may be cured, for example, by using UV and/or thermal techniques, depending on the particular material used. As explained in greater detail below, the depressions 112 are filled at least partially with a meta-material to form meta-atoms of the metastructure.

In particular, as illustrated in FIGS. 1C and 1D, the depressions 112 in the replication material 104 are at least partially filled with a meta-material 114, for example, by a sputtering technique. The meta-material may be, for example, a relatively high-index material such as silicon. Other materials conducive to sputtering can be used as well (e.g., other semiconductor material or metals).

As shown in FIG. 1D, the meta-material 114 may be completely fill the depressions 112 such that a thin residual layer 116 of the meta-material is present over most or all of the resulting surface. The residual layer 116 of meta-material subsequently may be flattened or removed, for example, by mechanical polishing or chemical mechanical polishing (CMP). FIG. 1E illustrates the resulting structure 120, which includes an arrangement of cone-shaped (or truncated cone-shaped) meta-atoms 118, each of which is surrounded laterally by the polymer layer 104 supported by the substrate

100. Thus, each of the meta-atoms can have a flared cross-section such that the cross-section increases (or decreases) substantially continuously from one end (e.g., the bottom) of the meta-atom to an opposite end (e.g., the top) of the meta-atom. In some implementations, each of the meta-atoms 118 has the shape of a right circular cone (i.e., having a circular base and an axis that passes through the center of the base at right angles to its plane). In other instances, each of the cone-shaped meta-atoms has a pyramid-shape (i.e., having a polygon-shaped base and triangular lateral faces that meet at the vertex). In some implementations, each of the meta-atoms has the shape of a truncated cone (i.e., a cone in which a region that includes the apex is cut off by a plane), such as a frustum. The metastructure can include meta-atoms 118 of relatively high-index material embedded in a layer 104 having a lower index.

In some instances, the structure of FIG. 1E serves as an optical element (e.g., a lens, lens array, beam splitter, diffuser, polarizer, bandpass filter, or other optical element) that can be integrated into an optical device (e.g., a light emitting or light receiving device). Further, in some instances, multiple structures as shown in FIG. 1E can be fabricated and attached to one another to form an assembly that has a double-sided cone-shaped (or truncated cone-shaped) structure. An example is described in the following paragraphs in connection with FIGS. 2A through 2D.

Figure 2A:
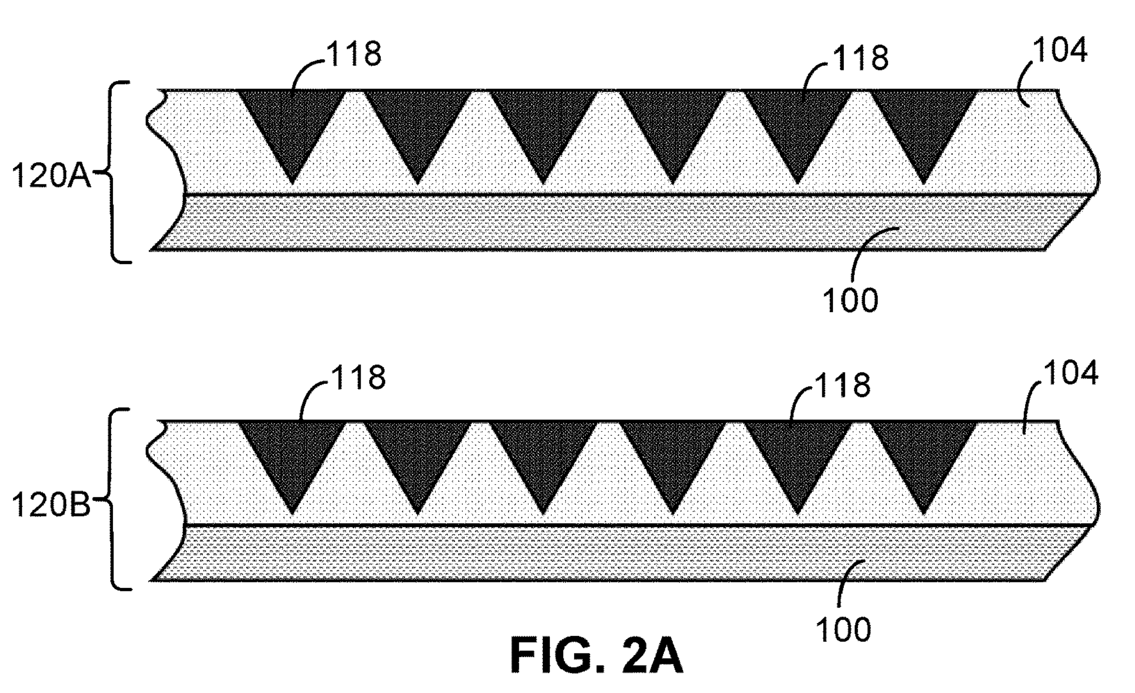
FIGS. 2A-2D illustrate a second example of fabricating a device that includes an optical metastructure including cone-shaped or truncated cone-shaped meta-atoms.
Figure 2B:
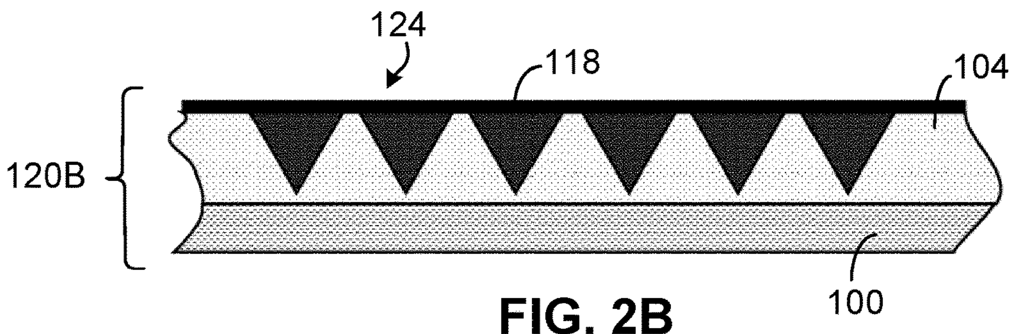

As shown in FIG. 2A, first and second sub-structures 120A, 120B, respectively, are fabricated, for example, in accordance with techniques described in connection with FIGS. 1A-1E. That is, each of the sub-structures 120A, 120B can be substantially the same as the structure 120 shown in FIG. 1E. An adhesive bonding layer 124 is provided on the exposed surface of one of sub-structures (e.g., 120B), as shown in FIG. 2B. The adhesive bonding layer 124 can be, for example, a UV or thermally-curable layer. For example, in some cases, the adhesive bonding layer 124 can comprise UV-light activated adhesive tape, UV-curable transfer tape, or dicing tape. In some instances, it may be desirable to process the as-deposited adhesive layer to make it thinner. For example, if the adhesive bonding layer 124 is composed of a polymer, it can be thinned by etching with oxygen plasma.

Figure 2C:
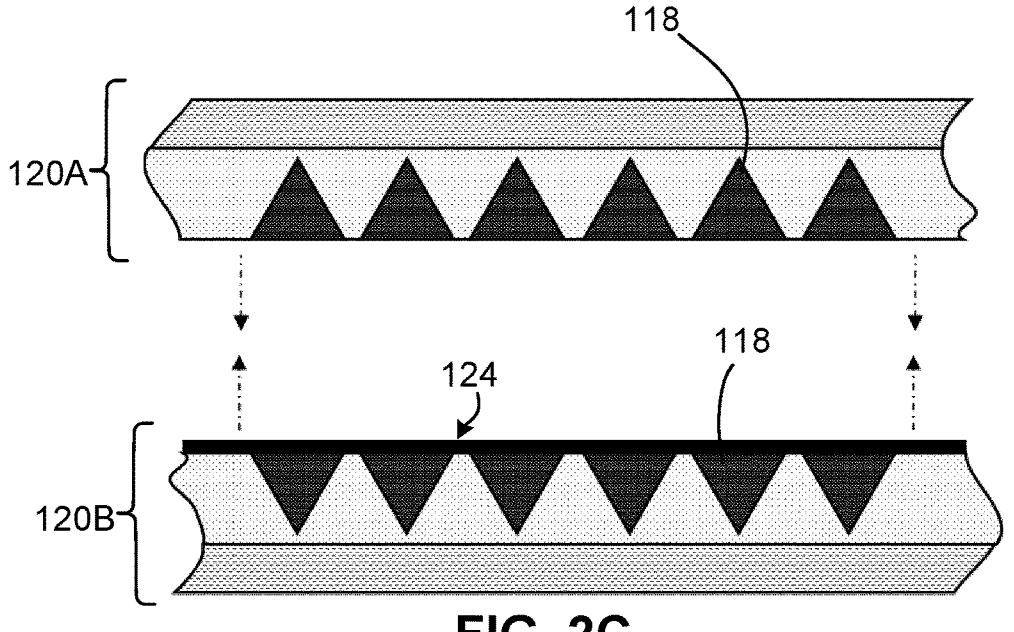
Figure 2D:
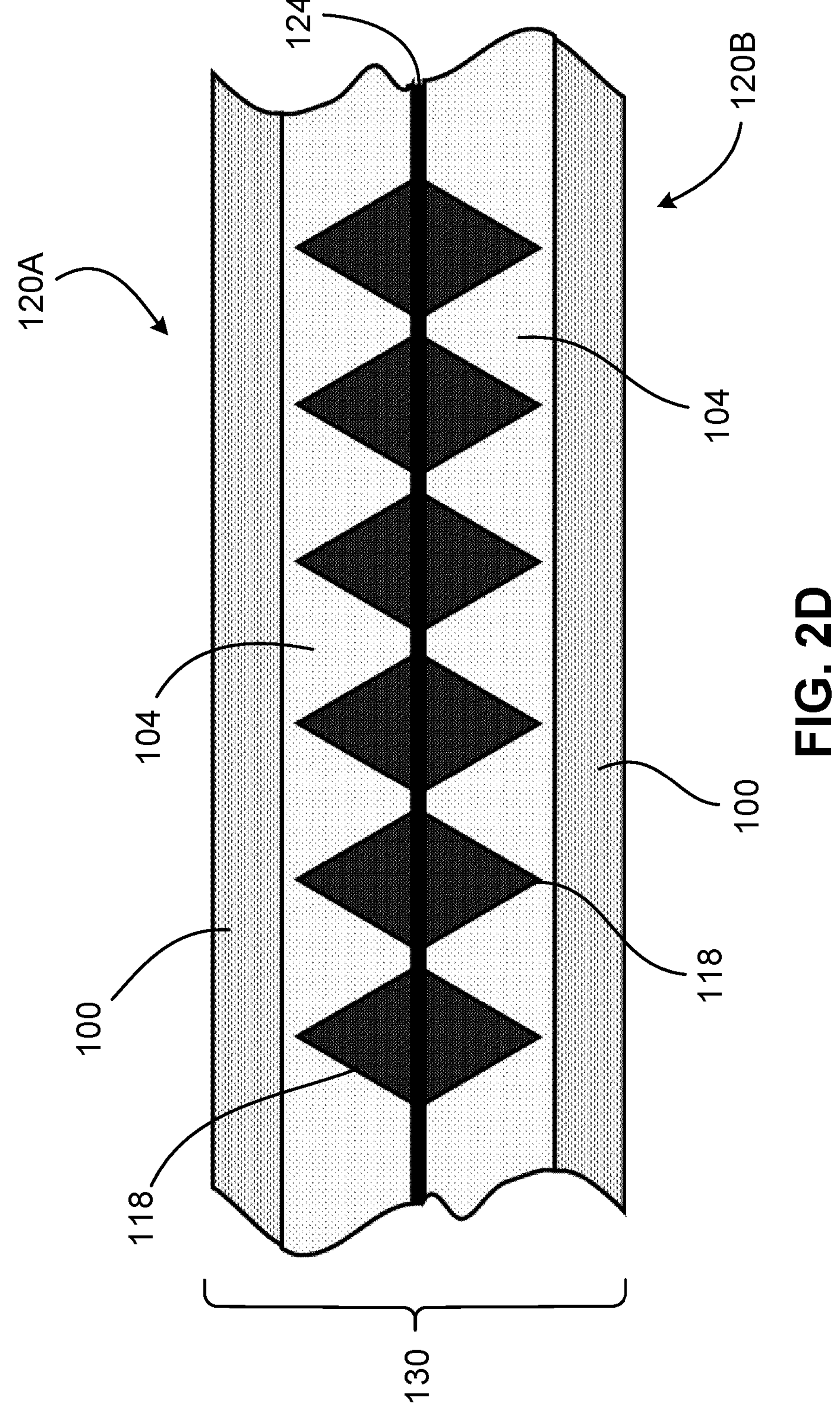

Next, as shown in FIG. 2C, one of the sub-structures (e.g., 120A) is flipped over such that the meta-atoms 118 of the first sub-structure 120A face the adhesive layer 124 on the second sub-structure 120B. Then, the two sub-structures 120A, 120B are brought into contact with one another as shown in FIG. 2D. Thus, the two-substructures 120A, 120B can be stacked one over the other such that the meta-atoms 118 of the sub-structure 120A are aligned with respective ones of the meta-atoms 118 of the sub-structure 120B. Once the two sub-structures 120A, 120B are in contact with one another, the adhesive layer 124 can be cured, either thermally or by applying UV radiation, or by both, depending on the nature of the adhesive. As shown in FIG. 2D, the resulting assembly 130 includes a double-sided structure composed of cone-shaped (or truncated cone-shaped) meta-atoms 118 in each of the sub-structures 120A, 120B. In this case, the meta-atoms 118 of the first sub-structure 120A are inverted with respect to the meta-atoms 118 of the second sub-structure 120B. In some cases, the optical functionality and performance of the resulting metastructure approximates a metastructure that has an arrangement of cylindrical or pillar-shaped meta-atoms.

FIGS. 3A through 3G illustrate fabrication of another sub-structure that includes an arrangement of cone-shaped (or truncated cone-shaped) meta-atoms and that can be incorporated, for example, into an assembly having multiple layers of meta-atoms disposed one over the other.

As shown in FIG. 3A, replication material 104 is disposed, for example, on a UV or thermally releasable layer 140 on a first substrate 100 and is imprinted using a stamp 106. Details of the substrate 100, the replication material 104, and the stamp 106 (including the projections 110) are as described above in connection with FIGS. 1A-1E. Thus, for example, the structured surface 108 of the stamp 106 preferably includes projections 110, each of which has a flared cross-section (e.g., cone-shaped or truncated cone-shaped) such that the cross-section increases (or decreases) substantially continuously from end of the projection to an opposite end of the projection. In this implementation, the substrate 100 can serve as a carrier substrate that subsequently is removed, as explained below.

As illustrated in FIG. 3B, imprinting by the stamp 106 causes the replication material 104 to have cone-shaped (or truncated cone-shaped) depressions 112, each of which is essentially a negative of a corresponding one of the stamp's projections 110. The replication material 104 may be cured, for example, by using UV and/or thermal techniques, depending on the particular material used. Further details of the imprinting are as described above in connection with FIG. 1B.

Next, as illustrated in FIGS. 3C and 3D, the depressions 112 in the replication material 104 are at least partially filled with a meta-material 114, for example, by a sputtering technique. The residual layer 116 of meta-material (if present) subsequently may be flattened or removed, for example, by mechanical polishing or CMP. Further details of the sputtering, as well as removed of the residual layer 116, are as described above in connection with FIGS. 1C and 1D. FIG. 3E illustrates the resulting structure, which includes an arrangement of cone-shaped (or truncated cone-shaped) meta-atoms 118, each of which is surrounded laterally by the polymer layer 104 supported by the substrate 100. At this stage, the release layer 140 remains disposed between the polymer layer 104 and the substrate 100.

Figure 3F:
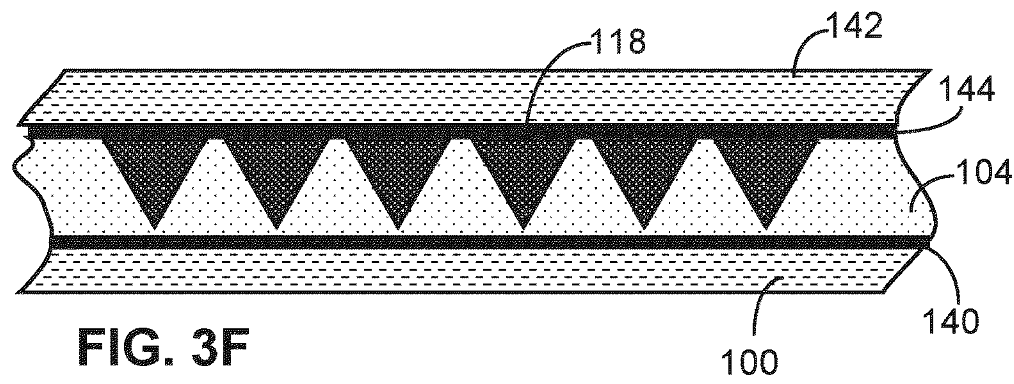
Figure 3G:
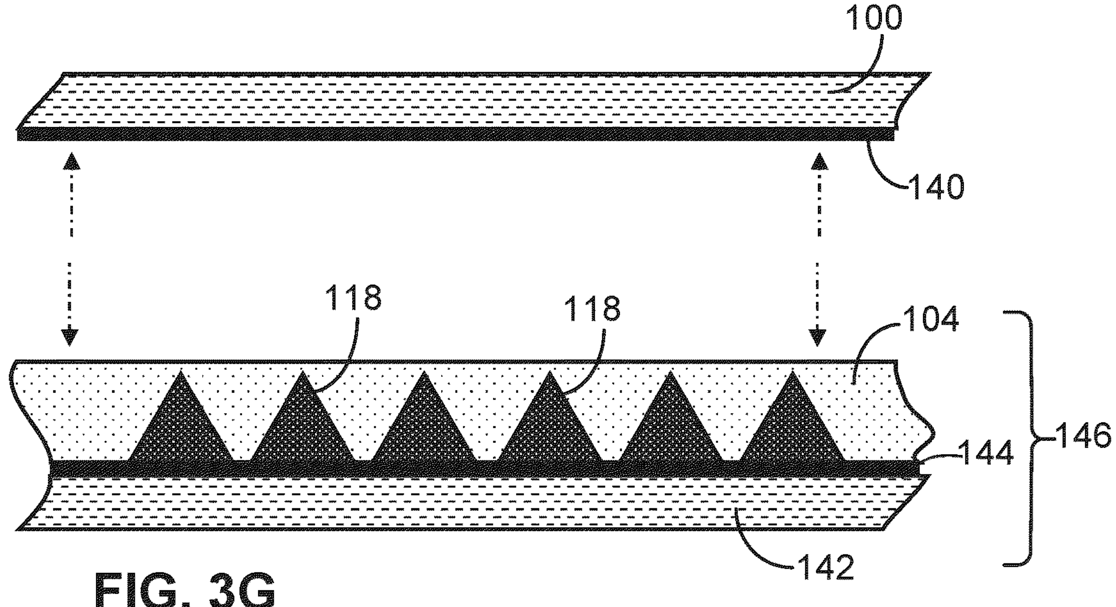

Next, as shown in FIG. 3F, a second substrate 142 is attached by an adhesive layer 144 over the meta-atoms 118 on a side of the polymer layer opposite that of the first substrate 100. Details of the second substrate 142 are as described in connection with FIG. 1A for the substrate 100. The adhesive layer 144 can be, for example, a UV or thermally-curable layer, similar to the adhesive layer 124 described above. After curing the adhesive layer 144, the first substrate 100 and the release layer 140 are removed, for example, by applying UV radiation or heat, depending on the nature of the release layer (see FIG. 3G). The resulting sub-structure 146 includes an arrangement of cone-shaped (or truncated cone-shaped) meta-atoms 118, each of which is surrounded laterally by the polymer layer 104 supported by the second substrate 142. Thus, the metastructure in FIG. 3G can include cone-shaped (or truncated cone-shaped) meta-atoms 118 of relatively high-index material embedded in a layer 104 having a lower index.

Figure 3H:
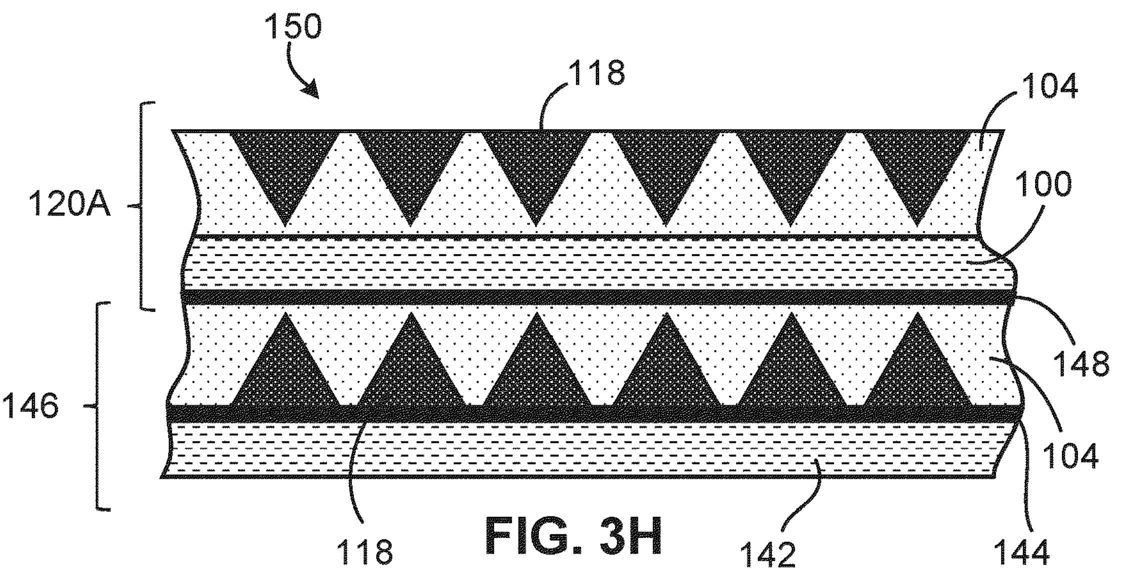

The sub-structure 146 can be attached, for example, to another sub-structure containing cone-shaped meta-atoms such that the two sub-structures are stacked one atop the other with their respective meat-atoms aligned to one another. For example, as shown in FIG. 3H, the sub-structure 146 of FIG. 3G can be attached (e.g., by a UV or thermal adhesive 148) to the sub-structure 120A (see FIG. 2A). The two-substructures 146, 120A are stacked one over the other such that the meta-atoms 118 of the sub-structure 146 are aligned with respective ones of the meta-atoms 118 of the sub-structure 120A. Once the two sub-structures 120A, 146 are in contact with one another, the adhesive layer 148 can be cured, either thermally or by applying UV radiation, or by both, depending on the nature of the adhesive. As shown in FIG. 3H, the resulting assembly 150 includes cone-shaped (or truncated cone-shaped) meta-atoms 118 in each of the sub-structures 120A, 146. In this case, the meta-atoms 118 of the first sub-structure 146 are inverted with respect to the meta-atoms 118 of the second sub-structure 120A. In some cases, the optical functionality and performance of the resulting metastructure approximates a metastructure that has an arrangement of cylindrical or pillar-shaped meta-atoms.

Figures 4A, 4B:
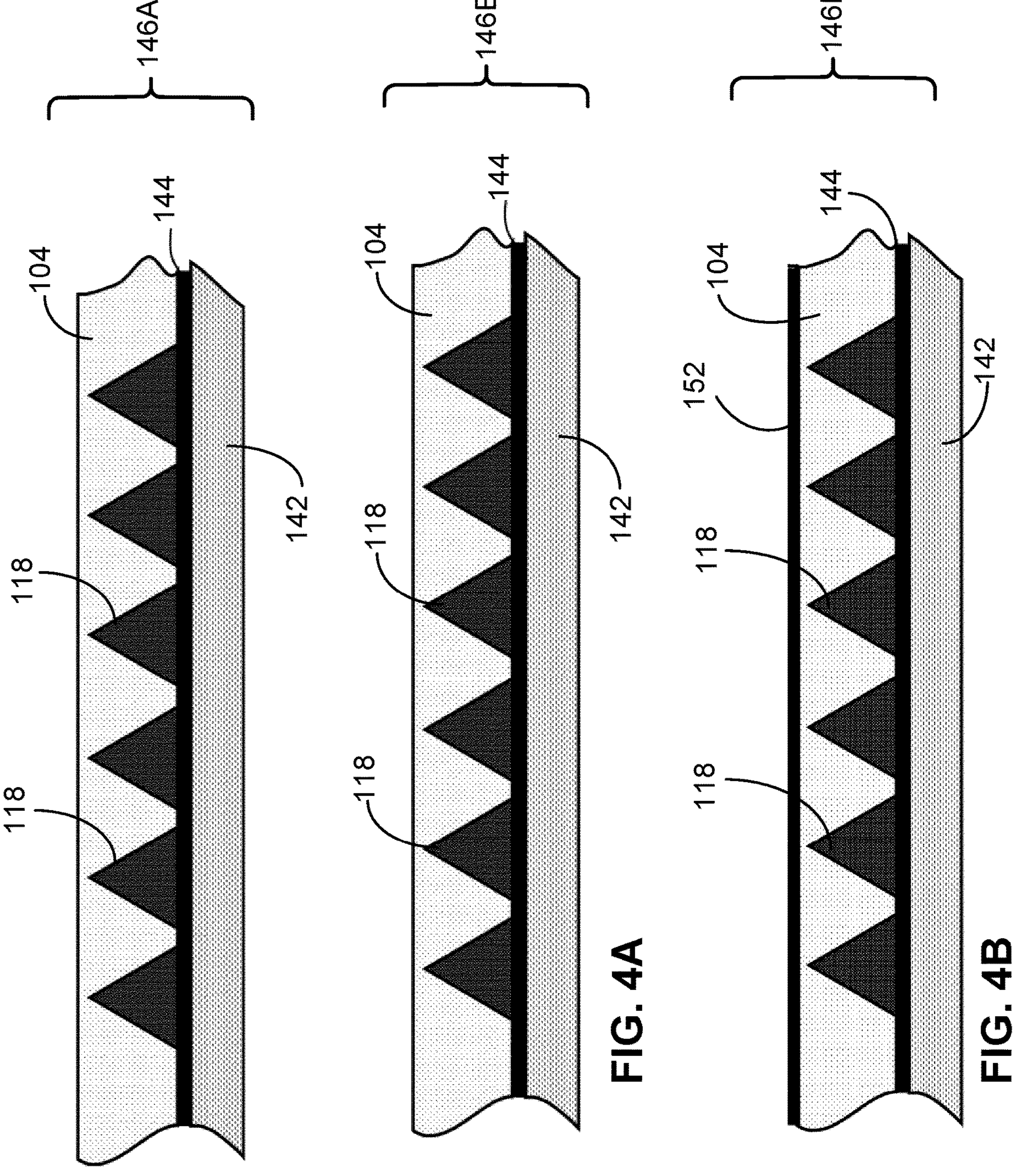
FIGS. 4A-4D illustrate a fourth example of fabricating a device that includes an optical metastructure including cone-shaped or truncated cone-shaped meta-atoms.

In some implementations, as shown in FIG. 4A, first and second sub-structures 146A, 146B, respectively, are fabricated, for example, in accordance with the techniques described in connection with FIGS. 3A-3G. That is, each of the sub-structures 146A, 146B can be substantially the same as the structure 146 shown in FIG. 3G. An adhesive layer 152 is provided on the exposed surface of one of sub-structures (e.g., 146B), as shown in FIG. 4B. The adhesive layer 152 can be, for example, a UV or thermally-curable layer.

Figures 4C, 4D, 5:
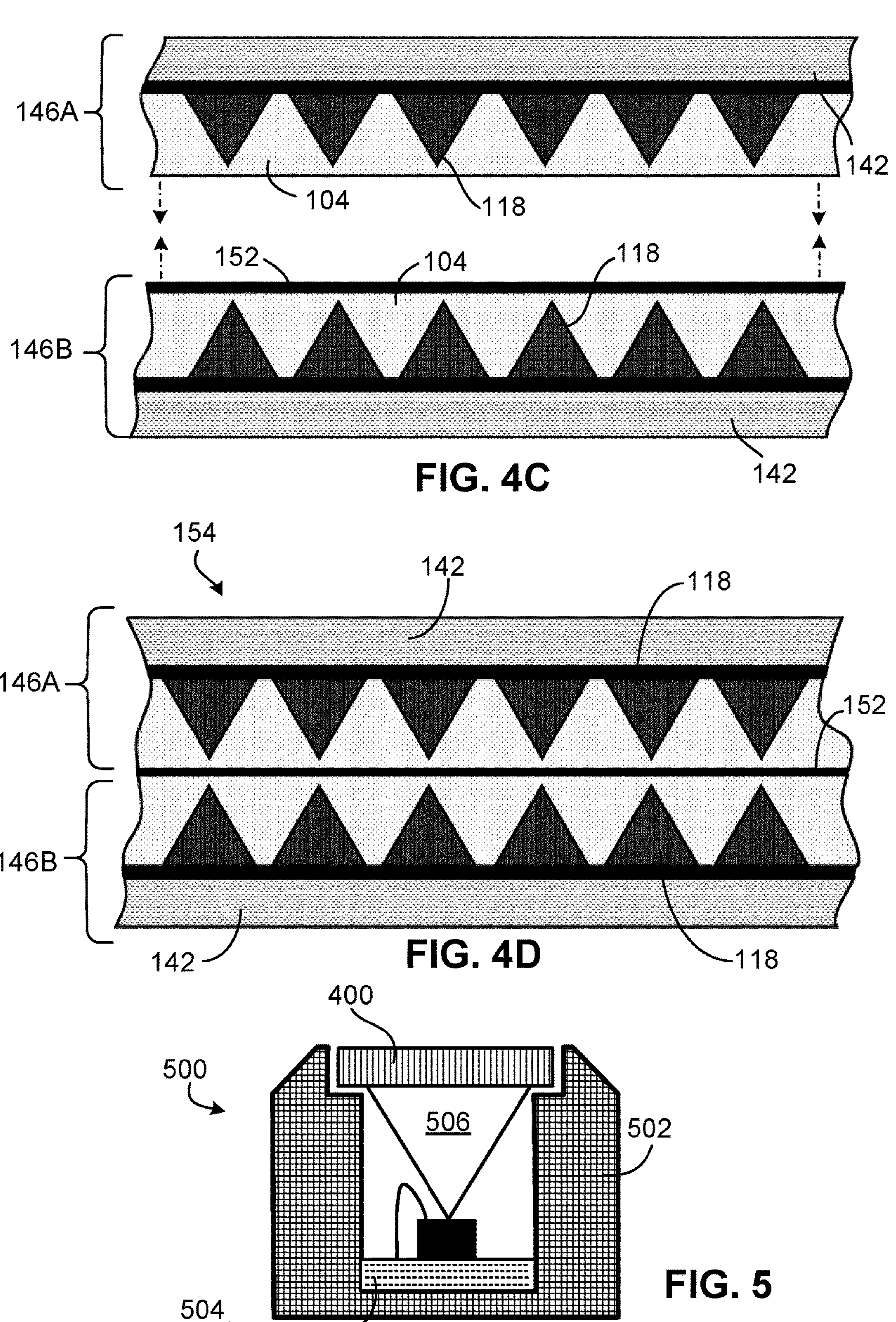
FIG. 5 depicts an example optoelectronic module in which a metastructure optical element is integrated.

Next, as shown in FIG. 4C, one of the sub-structures (e.g., 146A) is flipped over such that the meta-atoms 118 of the first sub-structure 146A face the adhesive layer 152 on the second sub-structure 146B. Then, the two sub-structures 146A, 146B are brought into contact with one another as shown in FIG. 2D. Thus, the two-substructures 146A, 146B can be stacked one over the other such that the meta-atoms 118 of the sub-structure 146A are aligned with respective ones of the meta-atoms 118 of the sub-structure 146B. Once the two sub-structures 146A, 146B are in contact with one another, the adhesive layer 152 can be cured, either thermally or by applying UV radiation, or by both, depending on the nature of the adhesive. As shown in FIG. 4D, the resulting assembly 154 includes cone-shaped (or truncated cone-shaped) meta-atoms 118 in each of the sub-structures 146A, 46B. In this case, the meta-atoms 118 of the first sub-structure 146A are inverted with respect to the meta-atoms 118 of the second sub-structure 146B. In some cases, in the resulting assembly 154 of FIG. 4D, the meta-atoms 118 of the first sub-structure 146A can be closer to the meta-atoms 118 of the second sub-structure 146B than are the respective meta-atoms of the sub-structures 146 and 120A of FIG. 3H. In some cases, the optical functionality and performance of the resulting metastructure approximates a metastructure that has an arrangement of cylindrical or pillar-shaped meta-atoms.

As described above, various layers may be attached to one another, for example, by an adhesive bonding layer (e.g., adhesive bonding layers 124, 144 or 152). As noted above, these adhesive bonding layers can comprise, for example, UV-light activated adhesive tape, UV-curable transfer tape, or dicing tape. Other bonding layers, however, can be used in some implementations. For example, in some implementations, the process can include sputtering a fusible alloy at the step depicted in FIG. 1C, then polishing away most of the excess at the step depicted in FIG. 1D such that there is a residual layer (i.e., not polished away completely as in FIG. 1E). This residual layer can then serve as a bonding layer. For example, the process can include bringing together two assemblies (e.g., 120A and 120B, similar to FIG. 2C) and rapidly annealing (and bonding) the two surfaces (i.e., via adhesive bonding layer(s) 124) until the two assemblies are bonded together (similar to FIG. 2D). In some implementations, low-temperature plasma-activated bonding can be used to provide the adhesive bonding layer(s). For example, silicon can be deposited (as in FIG. 1D) and can be polished until there is a very thin residual layer (i.e., not polished away completely as in FIG. 1E). Then the silicon surfaces corresponding to the two assemblies (e.g., 120A, and 120B) can be activated with plasma, bonded, and annealed. Any number of similar processes can be used depending on the materials used for the replication material, the substrate, and the sputtered material.

The various structures and assemblies described above (e.g., in FIGS. 1E, 2D, 3H) may serve as an optical element (e.g., a lens, lens array, beam splitter, diffuser, polarizer, bandpass filter, or other optical element) that can be incorporated into an optoelectronic module (e.g., a light emitting or light sensing device). In such devices, the optical element can be positioned to intersect outgoing light (i.e., light produced by a light emitter such as a light emitting diode (LED), an infra-red (IR) LED, an organic LED (OLED), an infra-red (IR) laser or a vertical cavity surface emitting laser (VCSEL)) or to intersect incoming light that is to be detected by a light sensor (e.g., a CCD or CMOS sensor). The metastructure of the optical element can change, e.g., a local amplitude, local phase, or both, of the outgoing or incoming light wave.

FIG. 5 depicts an example of an optoelectronic module 500 in which a metastructure optical element 400, as described in this disclosure, is integrated. The optoelectronic module 500 includes a housing 502. The housing 502 can be composed of polymeric material, and may be manufactured by injection molding, for example. In some instances, the housing 502 can be composed of a lead frame and be composed of a ceramic and metal material. The optoelectronic module 500 further includes an active optoelectronic element 504 configured to emit or receive light 506. The metastructure optical element 400 is functionally disposed relative to the active optoelectronic element 504. That is, the metastructure optical element 400 is disposed such that the metastructure optical element 400 and the active optoelectronic element 504 can generate the intended optical effect during normal operation of the optoelectronic module 500.

Various modifications can be made within the scope and spirit of the foregoing disclosure. Further, features described above in connection with different examples may, in some cases, be included in the same implementation. Accordingly, other implementations are within the scope of the claims.

What is claimed is:

1. An apparatus comprising:
an optical element comprising:
an optical metasurface including meta-atoms,
wherein each of the meta-atoms is cone-shaped or has a truncated cone shape,
wherein each of the meta-atoms is surrounded laterally by a polymeric material that completely fills a space between adjacent meta-atoms, wherein the polymeric material forms a first planar surface at a base of the meta-atoms, and wherein the polymeric material forms a second planar surface at a top of the meta-atoms.

2. The apparatus of claim 1 wherein each of the meta-atoms has a shape of a right circular cone.

3. The apparatus of claim 1 wherein each of the meta-atoms has a polygon-shaped base and triangular lateral faces that meet at a vertex.

4. The apparatus of claim 1 wherein each of the meta-atoms is frustum-shaped.

5. The apparatus of claim 1 including:
a first sub-structure that includes first ones of the meta-atoms; and a second sub-structure that includes second ones of the meta-atoms, wherein the first and second sub-structures are stacked one over the other.

6. The apparatus of claim 5 wherein the first and second sub-substructures are separated from one another by a bonding layer.

7. The apparatus of claim 1, wherein the polymeric material forms the first planar surface with the base of the meta-atoms.

8. A method of manufacturing an optical element comprising:

imprinting a replication material using a stamp to form depressions in the replication material, wherein the stamp has projections that are pressed into the replication material, each of the projections being cone-shaped or having a truncated cone shape; and depositing a metamaterial in the depressions to form meta-atoms, each of the meta-atoms being cone-shaped or having a truncated cone shape, wherein the meta-atoms collectively form an optical element operable to change at least one of a local amplitude, a local phase, or both, of an outgoing or incoming wave, and wherein depositing the metamaterial in the depressions comprises completely filling the depressions with the metamaterial.

9. The method of claim 8 wherein the metamaterial is deposited in the depressions by sputtering.

10. The method of claim 9 including, after the sputtering, flattening or removing a residual layer of the metamaterial by polishing.

11. The method of claim 9 wherein the metamaterial comprises silicon.

12. The method of claim 9 wherein the metamaterial comprises a metal.

13. The method of claim 8, wherein the replication material comprises a polymeric material.

14. The method of claim 13, wherein each of the meta-atoms is surrounded laterally by the polymeric material.

15. The method of claim 8, wherein each of the meta-atoms has a shape of a right circular cone.

16. The method of claim 8, wherein each of the meta-atoms has a polygon-shaped base and triangular lateral faces that meet at a vertex.

17. The method of claim 8, wherein each of the meta-atoms is frustum-shaped.

18. An apparatus comprising:

at least one of a light emitter or a light sensor;

an optical element positioned to intersect an outgoing light wave produced by the light emitter or to intersect an incoming light wave that is to be detected by the light sensor, wherein the optical element comprises an optical metasurface including meta-atoms, wherein each of the meta-atoms is cone-shaped or has a truncated cone shape, wherein each of the meta-atoms is surrounded laterally by a polymeric material, wherein the polymeric material forms a first planar surface at a base of the meta-atoms, and wherein the polymeric material forms a second planar surface at a top of the meta-atoms.

19. The apparatus of claim 18 wherein the metasurface is operable to change at least one of a local amplitude, a local phase, or both, of the outgoing or incoming light wave.

20. The apparatus of claim 18, wherein the polymeric material forms the first planar surface with the base of the meta-atoms.

* * * * *